United States Patent
Suda et al.

(10) Patent No.: US 6,391,276 B1
(45) Date of Patent: May 21, 2002

(54) TITANIA-ZIRCONIA POWDER AND PROCESS FOR PRODUCING THE SAME

(75) Inventors: Akihiko Suda; Naoki Takahashi; Chika Ando; Toshio Kandori; Miho Hatanaka, all of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/525,232

(22) Filed: Mar. 14, 2000

(30) Foreign Application Priority Data

Mar. 15, 1999 (JP) ............................................. 11-068347
Mar. 10, 2000 (JP) ........................................ 2000-066907

(51) Int. Cl.$^7$ .......................... C01G 23/00; C04B 35/46; B01J 23/00; B01J 21/04; H01B 1/02
(52) U.S. Cl. .......................... 423/598; 501/134; 502/349; 502/350; 502/351; 502/439; 252/519.12; 252/520.2; 252/520.21
(58) Field of Search ................................. 423/598, 608, 423/610; 501/103, 134; 502/349, 350, 351, 439; 252/519.12, 520.2, 520.21

(56) References Cited

U.S. PATENT DOCUMENTS

| | | | | |
|---|---|---|---|---|
| 4,005,048 A | * | 1/1977 | Dowden et al. | 252/432 |
| 4,093,543 A | * | 6/1978 | Rodewald et al. | 210/59 |
| 4,753,902 A | * | 6/1988 | Ketcham | 501/87 |
| 5,082,820 A | * | 1/1992 | Mitsui et al. | 502/350 |
| 5,804,152 A | | 9/1998 | Miyoshi et al. | |
| 5,972,525 A | * | 10/1999 | Mori et al. | 428/632 |

FOREIGN PATENT DOCUMENTS

| | | |
|---|---|---|
| EP | 0 370 523 | 5/1990 |
| EP | 0 585 053 | 3/1994 |
| JP | 58-143839 | 8/1983 |
| JP | 6-304477 | 11/1994 |
| JP | 7-24774 | 3/1995 |
| JP | 9-926 | 1/1997 |
| JP | 9-221304 | 8/1997 |

OTHER PUBLICATIONS

M. J. Bannister, et al., Journal of American Ceramic Society, vol. 69, No. 11, pp. C–269 to C–271, "Solubility Of TiO$_2$ IN ZrO$_2$", Nov. 1986.

O. Yamaguchi, et al., Journal of the American Ceramic Society, vol. 72, No. 6, pp. 1065–1066, "Formation Of Zirconia Titanate Solid Solution From Alkoxides", Jun. 1, 1989.

A. Bianco, et al., Journal of the European Ceramic Society, vol. 18, No. 9, pp. 1235 to 1243, "Zirconium Titanate: From Polymeric Precursors To Bulk Ceramics", Jan. 1, 1998.

F. Capel, et al., Ceramics International, vol. 25, No. 7, pp. 639 to 648, "Structure–Electrical Properties Relationships In TiO$_2$–Doped Stabilized Tetragonal Zirconia Ceramics", Sep. 1999.

* cited by examiner

Primary Examiner—Steven P. Griffin
Assistant Examiner—Cam N. Nguyen
(74) Attorney, Agent, or Firm—Oblon, Spivak, McClelland, Maier & Neustadt, P.C.

(57) ABSTRACT

Disclosed are (1) a titania-zirconia powder having at least a part of the zirconia solid-dissolved in the titania crystalline phase or at least a part of the titania solid-dissolved in the zirconia crystalline phase, (2) a titania-zirconia powder containing 3 to 30 wt % of zirconia and 0.5 to 10 wt % of yttria and containing less than 20 wt %, in total, of at least a complex oxide having a composition of ZrTiO$_4$ or (Ti,Zr)O$_2$, monoclinic phase zirconia, and tetragonal phase zirconia, wherein the titania-zirconia powder comprises an anatase phase, and which retains a specific surface area of 34 m$^2$/g or more after heat-treated at 900° C. for 5 hours in the air, and (3) a titania-zirconia powder wherein the titania-zirconia powder (1) or (2) having an average particle size of 1 μm or smaller is mutually dispersed with an alumina powder; and processes for producing the powders are disclosed.

24 Claims, 7 Drawing Sheets

TITANIA-ZIRCONIA POWDER AND PROCESS FOR PRODUCING THE SAME

FIELD OF THE INVENTION

This invention relates to a titania-zirconia or titania-zirconia-alumina powder and a process for producing the same. More particularly, it relates to a novel titania-zirconia or titania-zirconia-alumina powder which is suitable as a catalyst carrier or a co-catalyst, particularly for purifying automotive exhaust gases or as a catalyst carrier for use in high temperature gases containing sulfur, and a process for producing the powder.

BACKGROUND OF THE INVENTION

In order to improve the properties of titania powder used as a catalyst carrier or a co-catalyst, zirconia is frequently used as an additive in combination with an alkaline earth metal, a transition element, and a rare earth element.

For example, JP-A-58-143839 (The term "JP-A" as used herein means an "unexamined published Japanese patent application") discloses a catalyst for purifying nitrogen oxides comprising (A) a modified complex oxide obtained by treating a titanium-zirconium binary complex oxide with barium, (B) a vanadium oxide, and (C) an oxide and/or a sulfate of at least one element selected from the group consisting of tungsten, molybdenum, tin, chromium, manganese, cerium, and iron. Thus, it is known that the combined use of zirconia provides a catalyst which exhibits high activity in a broad temperature range and at a high space velocity without being influenced by oxygen, $SO_x$, carbonic acid gas, steam, halogen compounds, and hydrocarbons present in exhaust gases or by smog and has a small ability of oxidizing $SO_2$ to $SO_3$.

JP-A-8-192051 discloses a catalyst for purifying exhaust gases which comprises a carrier comprising a titanium-zirconium complex oxide, an $NO_x$ storage component selected from among alkali metals, alkaline earth metals and rare earth elements and supported on the carrier, and a noble metal supported on the carrier. Accordingly, it is known in the art that a catalyst having a titanium-zirconium complex oxide as a carrier is less susceptible to poisoning by sulfate or sulfite ions than a catalyst having an alumina carrier, that a sulfate of an $NO_x$ storage component generated by the adsorbed sulfate or sulfite ions easily decomposes at a low temperature, and that the titanium-zirconium complex oxide carrier has improved heat resistance and improved acidity compared with a titanium carrier.

In this way numeral attempts have been made to date to impart heat resistance to titania and to improve the surface acidity of titania by addition of zirconia while retaining the resistance of titania against sulfur poisoning. However, it has been unknown that the contemplated effects can be enhanced by solid dissolving zirconia in an anatase phase of titania or by solid dissolving titania in a tetragonal phase of zirconia and that use of such a solid solution powder as a carrier provides a catalyst with markedly increased performance.

JP-B-7-24774 (The term "JP-B" as used herein means an "examined Japanese patent publication") proposes an oxidizable substance- and/or nitrogen oxide-containing carrier for a catalyst for treating exhaust gases, which comprise an inorganic refractory oxide obtained by heat-treating a material containing a titanium compound and a zirconium compound at 660 to 900° C., the inorganic refractory oxide comprising 20 to 90 mol % of $TiO_2$ and 10 to 80 mol % of $ZrO_2$ and containing at least 20% by weight of a titanium-zirconium complex oxide having a crystal structure of $ZrTiO_4$. This proposal contemplates providing a carrier which provides a catalyst having high purifying performance and improved heat resistance by taking advantage of the strong solid acidity and higher heat resistance of $ZrTiO_4$ than the heat resistance of titania alone or zirconia alone. It is essential, therefore, for the inorganic refractory oxide to contain at least 20% by weight of $ZrTiO_4$.

However, JP-B-7-24774 does not mention the importance of preventing sulfur poisoning and of high-temperature non-reactivity with an alkaline salt, which is an $NO_x$ storage component, in $NO_x$-storage and reduction type catalysts; still less suggests that it is rather a key point for this importance that titania-zirconia powder be free from basic sites on its surface.

It is utterly unknown that high performance could be exerted in terms of the above-mentioned sulfur poisoning resistance and non-reactivity with an $NO_x$ storage component, not in an area mainly comprising $ZrTiO_4$, but in a titania-rich solid solution system mainly comprising an anatase phase or in a zirconia-rich solid solution mainly comprising an tetragonal phase.

JP-A-6-304477 describes an amorphous zirconium-titanium complex oxide (partly crystalline but totally amorphous) having a $ZrO_2$: $TiO_2$ weight ratio of 5:95 to 95:5 and a process for producing the same. However, as is taught in JP-B-7-24774 supra, a zirconium-titanium complex oxide obtained by the general co-precipitation method comes to have a composition mainly comprising $ZrTiO_4$ on being heat-treated at 700° C. or higher temperatures. The crystal structure according to the present invention (a structure having titania solid-dissolved in a tetragonal phase of zirconia, with a small amount of $ZrTiO_4$ or a monoclinic phase of zirconia being present around the solid solution grains; hereinafter described in detail) is not obtained by the co-precipitation method. Further, JP-A-6-304477 merely describes the amorphous complex oxide of zirconium and titanium, only reciting the general co-precipitation method as a method of production. Accordingly, it is apparently recognized that the amorphous (partially crystalline but totally amorphous) zirconium-titanium complex oxide disclosed in JP-A-6-304477 would be inferior in heat resistance and alkali resistance when used as a carrier for a $NO_x$-storage reduction type catalyst, as is with the oxidizable substance comprising the inorganic refractory oxide disclosed in JP-B-7-24774. It is absolutely unknown that it is important for titania-zirconia powder to be not only amorphous but be capable of maintaining a large specific surface area even after heat treatment.

We find no literature on attempts to improve heat resistance of titania powder without changing its characteristic that there are only acidic sites with few basic sites on the surface. It is also unknown that a titanium-zirconium oxide solid solution having zirconia solid-dissolved in an anatase phase of titania or having titania solid-dissolved in a tetragonal phase of zirconia exhibits both excellent heat resistance and sulfur poisoning resistance.

With regard to an oxide solid solution, JP-A-9-221304 discloses a cerium-zirconium oxide solid solution but has no mention of an oxide solid solution having zirconia or titania solid-dissolved in titania or zirconia, respectively.

Commercially available titania powder (titania powder having an anatase crystalline phase) is so inferior in heat resistance that it extremely reduces the specific surface area on heating at high temperature. That is, it is unable to maintain a desired specific surface area after completion of high-temperature treatment. None of available titania powders, except of $TiO_2$—$SiO_2$ system, maintains a specific surface area of 45 $m^2/g$ or more when heated at 800° C. for 5 hours in the air.

JP-A-9-926 discloses a catalyst for purifying exhaust gases which comprises a carrier of a Ti—Zr—Al complex oxide having supported thereon an $NO_x$ storage component and a noble metal catalyst. It is hence known as disclosed that a combination of titania, zirconia, and alumina enjoys both the effects of the Ti—Zr complex oxide in preventing sulfur poisoning and improving heat resistance and the effects of an aluminum oxide in further improving the heat resistance. However, it is not known in the art that these effects produced by the Ti—Zr—Al ternary oxide in prevention of asulfur poisoning and heat resistance improvement can be enhanced where the Ti—Zr complex oxide in this ternary oxide system is an oxide solid solution having zirconia or titania solid-dissolved in titania or zirconia, respectively.

The social recognition of the importance of environmental conservation has ever been growing, and the demand for purifying exhaust gases from automobiles, etc. has been increasing. In this situation, the purifying performance of the background art catalysts is far below the desired levels.

SUMMARY OF THE INVENTION

An object of the present invention is to provide a novel titania-zirconia powder and a novel titania-zirconia-alumina powder that have high resistance against poisoning with acidic substances, such as sulfur compounds, easily desorb such poisoning substances having been once adsorbed, and are capable of maintaining a high specific surface area even on being heated in a high temperature.

Another object of the invention is to provide a novel titania-zirconia powder and a novel titania-zirconia-alumina powder which exhibit markedly improved heat resistance without impairing the characteristic of titania's having few basic sites on the surface.

A further object of the invention is to provide processes for producing these novel powders.

The objects of the present invention are accomplished by the following embodiments:

(1) A titania-zirconia powder, wherein at least a part of the zirconia is dissolved in the crystalline phase of titania to form a solid solution, or at least a part of titania is dissolved in the crystalline phase of zirconia to form a solid solution.

(2) An amorphous titania-zirconia powder, being a titania-zirconia powder wherein at least apart of the zirconia is dissolved in the crystalline phase of titania to form a solid solution, or at least a part of titania is dissolved in the crystalline phase of zirconia to form a solid solution after heat treatment.

(3) The titania-zirconia powder as set forth in (1), comprising a zirconia in an amount of 3 to 30% by weight, and having a specific surface area of 45 $m^2/g$ or more after being heat-treated at 800° C. for 5 hours in the air, wherein the titania-zirconia powder comprises an anatase phase, and at least one of a complex oxide having a composition of $ZrTiO_4$ or (Ti,Zr) $O_2$, monoclinic phase zirconia, and tetragonal phase zirconia is contained in an amount of less than 20% by weight in total.

(4) The titania-zirconia powder as set forth in (3), further comprising an yttria in an amount of 0.5 to 10% by weight, and having a specific surface area of 34 $m^2/g$ or more after being heat-treated at 900° C. for 5 hours in the air.

(5) The titania-zirconia powder as set forth in (3), wherein at least a part of the zirconia is dissolved in the anatase phase to form a solid solution, and the at least one of the complex oxide, monoclinic phase zirconia, and tetragonal phase zirconia is dispersed in the anatase phase.

(6) The titania-zirconia powder as set forth in (4), wherein at least a part of the zirconia is dissolved in the anatase phase to form a solid solution, and wherein at least one of the complex oxide and the tetragonal phase zirconia is dispersed in the anatase phase.

(7) The amorphous titania-zirconia powder as set forth in (2), being amorphous in the proportion of 90% by volume or more, comprising 60 to 85% by weight of zirconia, and having a specific surface area of 140 $m^2/g$ or more after being heat-treated at 500° C. for 5 hours in the air.

(8) The titania-zirconia powder as set forth in (1), comprising a titania in an amount of 15 to 40% by weight, and having a specific surface area of 35 $m^2/g$ or more after being heat-treated at 800° C. for 5 hours in the air, wherein the titania-zirconia powder comprises a tetragonal crystalline phase, at least a part of the titania is dissolved in said tetragonal phase to form a solid solution, and at least one of a complex oxide having a composition of $ZrTiO_4$ or (Ti,Zr) $O_2$, monoclinic phase zirconia, and anatase phase titania is contained in an amount of less than 20% by weight in total.

(9) The amorphous titania-zirconia powder as set forth in (7), being a titania-zirconia powder having a specific surface area of 35 $m^2/g$ or more after being heat-treated at 800° C. for 5 hours in the air, wherein the titania-zirconia powder comprises a tetragonal crystalline phase, at least a part of the titania is dissolved in the tetragonal phase to form a solid solution, and at least one of a complex oxide having a composition of $ZrTiO_2$ or (Ti,Zr)$O_2$, monoclinic phase zirconia, and anatase phase titania is contained in an amount of less than 20% by volume in total.

(10) A catalyst carrier or a co-catalyst for purifying automotive exhaust gases which comprises the titania-zirconia powder of (1).

(11) A catalyst carrier or a co-catalyst for purifying automotive exhaust gases, comprising the amorphous titania-zirconia powder of (2).

(12) The titania-zirconia powder as set forth in (3), having an average particle size of 1 μm or smaller, and dispersed in an alumina powder.

(13) The titania-zirconia powder as set forth in (7), having an average particle size of 1 μm or smaller, and dispersed in an alumina powder.

(14) The amorphous titania-zirconia powder as set forth in (8), having an average particle size of 1 μm or smaller, and dispersed in an alumina powder.

(15) The titania-zirconia powder as set forth in (12), wherein the alumina powder has an average particle size of 1 μm or smaller.

(16) The titania-zirconia powder as set forth in (13), wherein the alumina powder has an average particle size of 1 μm or smaller.

(17) The amorphous titania-zirconia powder as set forth in (14), wherein the alumina powder has an average particle size of 1 μm or smaller.

(18) The titania-zirconia powder as set forth in (3), having an average particle size of 0.1 μm or smaller and uniformly dispersed in an alumina powder having an average particle size of 0.1 μm or smaller.

(19) The titania-zirconia powder as set forth in (7), having an average particle size of 0.1 μm or smaller and uniformly dispersed in an alumina powder having an average particle size of 0.1 μm or smaller.

(20) The titania-zirconia powder as set forth in (8), having an average particle size of 0.1 μm or smaller and uniformly dispersed in an alumina powder having an average particle size of 0.1 μm or smaller.

(21) A process for producing a titania-zirconia powder comprising the steps of:
(a) preparing a raw material aqueous solution comprising a titanium salt and a zirconium salt, the concentrations of the titanium salt and the zirconium salt being adjusted so as to give a final titania,/zirconia weight ratio of 97/3 to 70/30 or 40/60 to 15/85,
(b) adding a pH adjusting agent to the raw material aqueous solution while powerfully stirring to form a precipitate, and
(c) drying and calcining the precipitate.

(22) The process for producing a titania-zirconia powder as set forth in (21), wherein the raw material aqueous solution in step (a) further comprises aqueous hydrogen peroxide and a surface active agent.

(23) The process for producing a titania-zirconia powder as set forth in (21), wherein the raw material aqueous solution in step (a) further comprises yttrium in an amount of 0.5 to 10% by weight in terms of yttrium oxide based on the total amount of the titania-zirconia-yttria.

(24) The process for producing a titania-zirconia powder as set forth in (21), wherein the powerful stirring in step (b) is carried out uniformly in a homogenizer.

(25) The process for producing a titania-zirconia powder as set forth in (21), wherein the drying and calcining in step (c) is carried out at a rate of temperature rise of 100° C./hr or lower.

(26) The process for producing a titania-zirconia powder as set forth in (21), wherein the raw material aqueous solution further comprises an aluminum salt.

(27) The process for producing a titania-zirconia powder as set forth in (21), further comprising the step of preparing a raw material aqueous solution comprising an aluminum salt, wherein a pH adjusting agent is added to each of the raw material aqueous solution comprising the titanium salt and the zirconium salt and the raw material aqueous solution comprising the aluminum salt, and the formed precipitated is uniformly mixed.

The present invention provides a titania-zirconia powder, a yttria-containing titania-zirconia powder, and a titania-zirconia-alumina powder which exhibit excellent resistance to poisoning by acidic substances and excellent properties of desorbing the acidic substances, maintains a large specific surface area even after a high-temperature treatment, and can have its heat resistance markedly increased without changing the characteristic of titania that there are few basic sites on the surface. Therefore, the present invention provides powders which are suitable as a catalyst carrier or a co-catalyst, particularly as a catalyst carrier or a co-catalyst for purifying automotive exhaust gases or as a catalyst carrier for use in high temperature gases containing sulfur.

BRIEF DESCRIPTION OF THE DRAWINGS

FIGS. 1A and 1B each is a graph of specific surface area of the titania-zirconia powders ($TiO_2$: 0 to 100 wt %) obtained in Examples 1 to 9 and Comparative Examples 1 to 5, wherein FIG. 1A is a graphical representation of Table 1, showing the relationship of specific surface area of the titania-zirconia powders after heat-treated at 500° C. for 5 hours vs. zirconia content and FIG. 1B is a graphical representation of Table 1, showing the relationship of specific surface area of the titania-zirconia powders after heat-treated at 800° C. for 5 hours vs. zirconia content.

DETAILED DESCRIPTION OF THE INVENTION

Figure 1A:
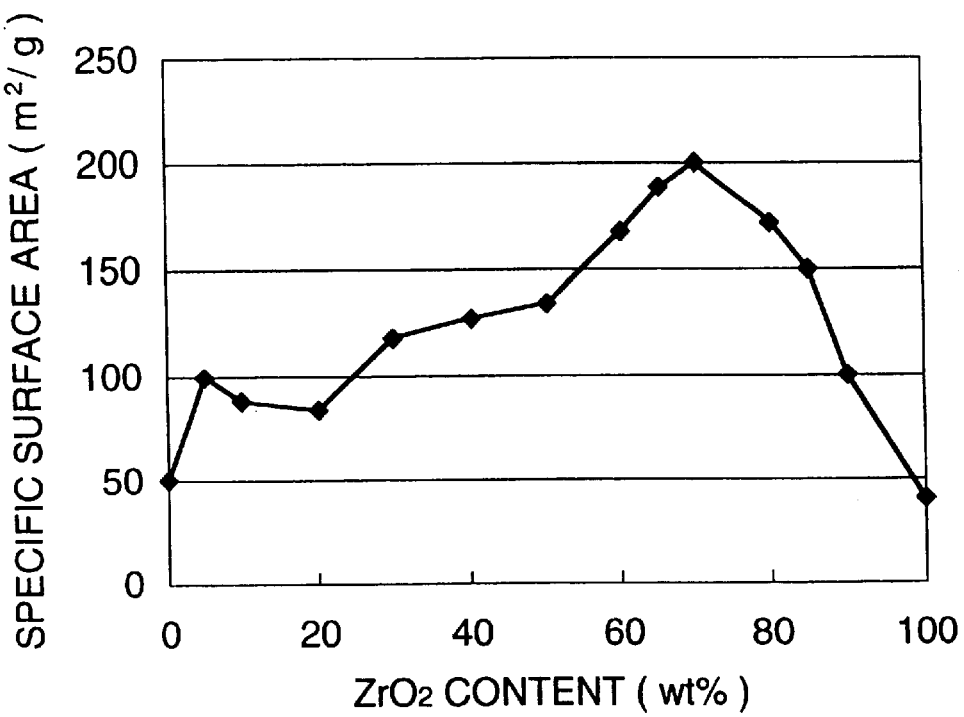

The weight percents representing the proportions of oxide components in powder, such as titania, zirconia and yttria, as used herein are those obtained by ICP (inductively coupled plasma mass spectroscopy).

The volume percents representing the proportions of a crystalline phase and an amorphous phase as used herein are those obtained by powder X-ray diffractometry. The weight percents representing the proportions of a crystalline phase and an amorphous phase are those calculated from the above-specified volume percents and the respective densities.

In the titania-zirconia powder (1) according to the invention, at least a part of zirconia is dissolved in the crystalline phase of titania to form a solid solution, or at least a part of titania is dissolved in the crystalline phase of zirconia to form a solid solution. Such solid solution states will be apparent from the peak shift of the crystalline phase of titania (anatase phase) shown in Table 2 (FIG. 2) and the peak shift of the crystalline phase of zirconia (tetragonal phase) shown in Table 3 (FIG. 3). The details will be given later.

Comprising such a solid solution, the powder can maintain a large specific surface area even after a high-temperature treatment to provide a titania-zirconia powder having excellent resistance to poisoning by acidic substances and the property of easily desorbing the adsorbed acidic substances. Further, the powder can be converted to a titania-zirconia powder with greatly improved heat resistance without impairing the property of having few basic sites on the surface, which is characteristic of titania.

The amorphous titania-zirconia powder 2 capable of producing the powder 1 also maintains a large specific surface area even after a high-temperature treatment to provide a titania-zirconia powder having excellent resistance to poisoning by acidic substances and the property of easily desorbing the adsorbed acidic substances. Further, the powder 2 can be converted to a titania-zirconia powder with greatly improved heat resistance without impairing the titania's characteristic of having few basic sites on the surface.

The titania-zirconia powders 3, 4, 5 and 6 of the present invention which contain 3 to 30% by weight of zirconia and in which the titania has an anatase crystalline phase maintain a specific surface area of 45 m$^2$/g or more when heat-treated at 800° C. for 5 hours in the air. In these powders, at least a part of the zirconia is dissolved in the anatase phase to form a solid solution. The rest of the zirconia, which is not dissolved, is in the form of a complex oxide having the composition of $ZrTiO_4$ or $(Ti,Zr)O_2$ or in the form of a tetragonal phase and is dispersed around the titania.

The facr that part of the zirconia is dissolved in the anatase phase of titania will be recognized from the peak shift of the anatase phase shown in Table 2 (FIG. 2) as hereinafter described. The peak is shifted to the smaller 2θ angle side, i.e., the lattice constant tends to increase, which agrees with the solid dissolution of zirconium ions having a larger ionic radius than titanium ions.

Further, as shown in Table 3 and FIG. 3, the 800° C. calcined powders having up to 20% by weight of a zirconia content substantially comprise an anatase phase, while a peak attributed to the (111) plane of a $(Ti,Zr)O_2$ complex oxide phase appears at 2θ=30.64° C., which corresponds to the first peak of the $(Ti,Zr)O_2$ complex oxide phase, appears with a zirconia content of 30% by weight. It is thus recognized that the zirconia which is not solid-dissolved in the anatase phase exists in the form of the $(Ti,Zr)O_2$ complex oxide phase. From the fact that such a crystalline phase constitution is confirmed regardless of the sampling positions, it is considered that the $(Ti,Zr)O_2$ complex oxide phase is finely dispersed in the anatase phase.

The $(Ti,Zr)O_2$ complex oxide phase content is less than 20% by weight, preferably 10% by weight or less, still preferably 5% by weight or less.

Figure 1B:
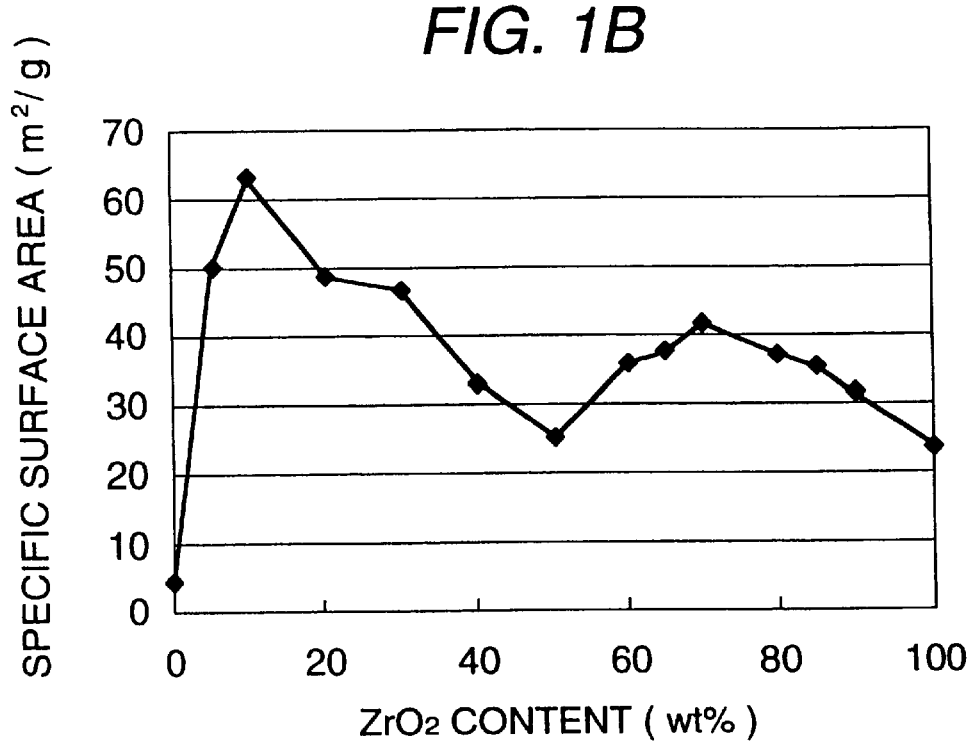

With the zirconia content falling within the range of from 3 to 30% by weight, the powder maintains a specific surface area of 45 m$^2$/g or more when heat-treated at 800° C. for 5 hours in the air as will be demonstrated in Examples (Table 1 and FIG. 1B). Out of the recited zirconia content, such a large specific surface area cannot be secured after the 800° C. heat treatment. This seems to be because the zirconia content within this range can be dissolved in the anatase phase of titania to stabilize the crystalline phase and also because the zirconia grains present among the titania grains prevent sintering.

The titania-zirconia powder (7) of the invention, which is amorphous in the proportion of 90% by volume or more, comprises 60 to 85% by weight of zirconia, and maintains a specific surface area of 140 m$^2$/g or more after being heat-treated at 500° C. for 5 hours in the air and a specific surface area of 35 m$^2$/g or more after being heat-treated at 800° C. for 5 hours in the air, as demonstrated in Table 1 and FIGS. 1A and 1B.

The titania-zirconia powder (8) of the invention, wherein the crystalline phase comprises zirconia having a tetragonal phase, titania is present in an amount of 15 to 40% by weight, at least a part of the titania is dissolved in the tetragonal phase, and the total content of a complex oxide having a composition of $ZrTiO_4$ or $(Ti,Zr)O_2$, monoclinic phase zirconia, and anatase phase titania is less than 20% by weight, has a specific surface area of 35 m$^2$/g or more when heat-treated at 800° C. for 5 hours in the air as demonstrated in Table 1 and FIG. 1B.

The titania-zirconia powder of the invention having a zirconia content of 60 to 85% by weight which is obtained by heating at temperatures of 500° C. or lower comprises an amorphous phase in the proportion of 90% by volume or more. When heated to 600° C. or higher, there are precipitated titania-zirconia grains in which zirconia has a tetragonal phase having titania solid-dissolved therein as will be shown in FIG. 3.

As shown in FIG. 3 (and Table 3), the peak assigned to the (101) plane of the tetragonal phase zirconia is shifted with an increase of the titania content, indicating that titania is solid-dissolved therein. That is, the peak is shifted to the larger angle (2θ) side, i.e., the lattice constant tends to become smaller, which agrees with the fact that the ionic radius of titanium ions is smaller than that of zirconium ions. Further, as shown in Table 4 (and FIG. 3), a small amount of a monoclinic phase of zirconia appears with the zirconia content of 80% by weight or more, and a small amount of a $(Ti,Zr)O_2$ complex oxide phase appears with the zirconia content of 70% by weight or less. The content of the $(Ti,Zr)O_2$ complex oxide phase in the powder (8) is less than 20% by weight, preferably 10% by weight or less, still preferably 5% by weight or less.

The above-described titania-zirconia powder having a zirconia content of 3 to 30% by weight or 60 to 85% by weight can further contain yttria. The combined use of yttria brings about a further improvement on specific surface area retention particularly where the powder is used at temperatures exceeding 900° C. A preferred yttria content is 0.5 to 10% by weight, particularly 0.5 to 5% by weight, especially 1 to 3% by weight (see Table 5 and FIG. 6). The effect of yttria is saturated at 10% by weight.

The titania-zirconia powder (12) of the invention is a powder obtained by adjusting the average particle size of the above-described titania-zirconia powder according to the invention to 1 μm or smaller and dispersively mixing with an alumina powder. With the titania-zirconia powder and the alumina powder in a highly dispersed state, the characteristics of the titania-zirconia powder can be manifested more effectively, and, in addition, the dispersed alumina powder brings about further improvement on the heat resistance.

That is, in the titania-zirconia powder (12), the titania-zirconia powder is highly dispersed in an alumina powder to exhibit enhanced resistance to poisoning by acidic substances, such as sulfur. Further, being held by heat-resistant alumina, the titania-zirconia powder can retain its large specific surface area up to a high temperature. These effects are particularly noticeable with the titania-zirconia powder (15) which is obtained by uniformly dispersing the titania-zirconia powder in an alumina powder having an average particle size of 0.1 μm or smaller.

The mutually dispersed state of the titania-zirconia solid solution particles and the alumina particles are explained below in more detail. In the present invention, the dispersed state of particles is expressed in terms of average particle size of the particles. The average particle size can be obtained as follows.

At least 10 randomly selected fields of a sample, whether monocrystalline or polycrystalline, under a transmission or scanning electron microscope were photographed, and the maximum size (taken as a particle diameter) of 200 or more grains per micrograph was measured to obtain an arithmetic mean, which is taken as an average particle size of the titania-zirconia solid solution grains and of the alumina grains.

The method of particle size measurement is not limited to the above-described image processing, and other methods giving equivalent results can be adopted. For example, in cases where different kinds of particles are mechanically mixed up, a laser diffraction system particle size distribution measuring method provides equivalent results. A dynamic light scattering method also will do. However, where particles are ground during the mechanical mixing (preferential grinding), the dispersed state after the grinding must be confirmed by the image processing.

While the term "particle size" as used herein denotes the particle size of each component constituting the powder, where the particles show a bimodal size distribution including apparently coarse particles or microfine particles, such particles deviating from the predominant particle size distribution should be excluded in calculating the average particle size. The term "predominant particle size distribution" as used herein is intended to mean that the total volume of the particles belonging to the distribution curve is 50% by volume or more of the total particles. The term "average" as used herein is intended to mean the most frequent diameter of each single distribution standardized by volume.

For the titania-zirconia solid solution grains as dispersed among the alumina grains "to have an average particle size of 1 μm or less" has the following technical significance. As previously stated, the titania-zirconia solid solution grains have almost no basic sites on their surface so that acidic substances, such as sulfur, are hardly adsorbed thereon and, if adsorbed, easily desorbed therefrom. Therefore, the grains effectively prevents poisoning by such acidic substances. On the other hand, a noble metal which serves as active sites of a catalyst is supported more stably up to high temperatures on the surface of alumina grains than on the titania-zirconia solid solution grains. It is conceivable therefore to mechanically mix alumina grains and the titania-zirconia solid solution grains. It has been confirmed that a mechanical mixture of an alumina powder and titania-zirconia powder exerts the effect of reducing sulfur poisoning while holding a noble metal up to high temperatures. Considering the mechanism in which the titania-zirconia solid solution grains exert the resistance against sulfur poisoning, it is predicted that better results will be obtained by mixing the titania-zirconia powder with an alumina powder as finely as possible.

However, according to a general mixing operation it is extremely difficult to mix them with their particle size controlled to 1 μm or smaller. The present inventors have succeeded in obtaining the above-mentioned highly dispersed state by a method including the step of synthesizing the titania-zirconia solid solution grains in a solution in the presence of an alumina powder.

The titania-zirconia powder (12) in which the titania-zirconia solid solution grains having an average particle size of 1 μm or smaller are dispersed in alumina grains exhibits enhanced resistance to poisoning compared with a mere mechanical mixture of the alumina grains and the titania-zirconia solid solution grains where used as a catalyst carrier.

The improvement on the mutually dispersed state of the two powders can be ensured by using an alumina powder having an average particle size of 1 μm or smaller. In this case, the noble metal on the alumina is closer to the titania-zirconia solid solution grains thereby enjoying a more excellent effect of preventing poisoning. This effect of preventing poisoning is further pronounced where the titania-zirconia solid solution grains and the alumina grains are dispersed more finely.

The above effect is furthermore conspicuous where both powders are dispersed with a particle size of 0.1 μm or smaller, particularly 0.07 μm or smaller, which could not be achieved by preferential grinding or the above-described method in which the titania-zirconia solid solution grains are synthesized in the presence of an alumina powder. Such a finely dispersed state can be achieved by (i) a method including the step of forming a precipitate from a mixed aqueous solution of an aluminum salt, a titanium salt and a zirconium salt by pH adjustment or (ii) a method including the steps of forming precipitates separately from an aqueous solution of an aluminum salt and a mixed aqueous solution of a titanium salt and a zirconium salt and mixing the precipitates. When the titania-zirconia powder is mixed with the alumina powder in a dispersed state, the resulting powder mixture shows a specific surface area of 100 m²/g or more after being heat-treated at 800° C. for 5 hours in the air. Further, according to a method as shown in the aftermentioned Example 11, it is possible to obtain a mixed powder of a titania-zirconia powder and an alumina powder, each powder having an average particle size of 0.07 μm or smaller, which mixed powder shows a specific surface area of 110 m²/g or more after being heat-treated at 800° C. for 5 hours. Although it is not clear why the mixed powder shows such a higher specific surface area, it is presumed that the titania-zirconia powder is uniformly dispersed in the alumina powder and this causes such a high specific surface area.

It is preferred for the alumina powder to contain a rare earth element oxide (e.g., lanthanum oxide) or an alkaline earth metal oxide (e.g., barium oxide) in the form of a solid solution or a complex oxide. Such alumina powder exhibits improved heat resistance and thus is more preferable.

The titania-zirconia-alumina powder according to the invention can be used as a catalyst carrier either alone or in combination with commercially available alumina powder having an average particle size of 3 to 7 μm. In the former case, the alumina content is preferably 20 to 80% by weight, still preferably 40 to 60% by weight; and the alumina powder preferably has an average particle size of 0.1 μm or smaller.

In the latter case, the titania-zirconia-alumina powder of the invention can be mixed with, for example, the same weight percent of commercially available alumina having an average particle size of 3 to 7 μm. The mixture may be used as such or as applied to a support. The titania-zirconia-alumina powder to be used here preferably has an alumina content of 5 to 30% by weight, particularly 10 to 20% by weight. In this case, too, it is preferred for the alumina powder in the titania-zirconia-alumina powder to have an average particle size of 0.1 μm or smaller.

One of the greatest characteristics of the aforementioned titania-zirconia powder, yttria-containing titanium-zirconia powder, and titania-zirconia-alumina powder according to the present invention is that a large specific surface area can be maintained even after the powder is treated at a high temperature.

Titania powder is, in general, characterized by few basic sites on its surface. In this regard, another characteristic of the powders of the present invention lies in that the heat resistance can be improved greatly without impairing this characteristic of titania. Hence, having few basic sites on the crystal surfaces and having, instead, acidic sites equal or superior to titania alone in amount and intensity, the powders of the present invention exhibit excellent resistance against poisoning. That is, they hardly adsorb poisoning acidic substances, such as $SO_2$ gas, and easily desorb the acidic substances if adsorbed.

Having the above-described characteristics, the titania-zirconia powder, yttria-containing titanium-zirconia powder, and titania-zirconia-alumina powder according to the present invention are suitable as a catalyst carrier or a co-catalyst for purifying exhaust gases from automobile engines. Since a catalyst for purifying automotive exhaust gases comprises a noble metal catalyst component supported on a carrier, it is demanded for the carrier to have a large specific surface area sufficient to support the noble metal component in a highly dispersed state and to allow the catalyst component to come into contact with exhaust gases effectively. The carrier is also required to keep the large specific surface area at high temperatures at which the catalyst is applied.

Because the powders of the present invention are highly superior in sulfur poisoning resistance, alkali resistance and heat resistance, they are especially suited as a carrier of $NO_x$ storage and reduction type catalysts which contain an $NO_x$ storage component comprising an alkali metal or an alkaline earth metal in a high concentration (e.g., 0.1 mol or more per liter of a honeycomb catalyst) and which are exposed to a high temperature in an oxidizing atmosphere where sulfur is hardly desorbed.

Here, the carrier of $NO_x$ storage and reduction type catalysts is specifically explained below.

When the titania-zirconia powder dispersed in the alumina powder is used as a carrier of a catalyst having the composition: [Ba (0.2 mol)+K (0.1 mol)]/[Pt (2 g)+Rh (0.1 g)]/carrier (120 g), in other words, when 2 g of Pt and 0.1 g of Rh were adsorbed onto 120 g of the carrier, and 0.2 mol of barium acetate and 0.1 mol of potassium acetate were further supported thereon, if both powders are dispersed with a particle size of 1 $\mu$m or smaller, the catalyst shows the after-mentioned $NO_x$ storing ability of at least 7 $\mu$mol/0.5 g-cat. at 600° C. and if both powders are dispersed with a particle size of 0.1 $\mu$m or smaller, the catalyst shows the $NO_x$ storing ability of at least 9 $\mu$mol/0.5 g-cat. at 600° C., as shown in the after-mentioned Example.

Further, because the powders of the present invention retain the titania's characteristic of having few basic sites on the surface and possess acidic sites equal to or superior to those of titania alone in amount and intensity, they are highly resistant against sulfur poisoning. In addition, they have high heat resistance. Accordingly, they are suitable for general use as a carrier of catalysts that are used in high temperature gases containing sulfur.

The present invention also provide processes for producing the above-described titania-zirconia powder, yttria-containing titania-zirconia powder, and titania-zirconia-alumina powder.

The process for producing the titania-zirconia powder and the process for producing the yttria-containing titania-zirconia powder are characterized by including the step of powerfully stirring a raw material aqueous solution containing a titanium salt and a zirconium salt (and a yttrium salt in the latter process).

The "powerful stirring" as referred to herein can be expressed in terms of a shear rate. A preferred shear rate is 1000 $sec^{-1}$ or higher, particularly 10,000 $sec^{-1}$ or higher. The powerful stirring can be effected conveniently by means of a homogenizer (shearrate: 13,000 $sec^{-1}$) combined with a conventional propeller agitator for uniform stirring.

The titanium salt which can be used in the process is not particularly limited and includes titanium tetrachloride, titanium oxysulfate, ammonium titanium oxyoxalate, titanium nitrate, and other water-soluble titanium salts. The zirconium salt to be used is not particularly limited and includes zirconium oxysulfate, zirconium oxychloride, zirconium oxynitrate, zirconium nitrate, and other water-soluble zirconium salts. The yttrium salts to be used include yttrium nitrate.

It is preferred that the raw material aqueous solution contains aqueous hydrogen peroxide and a surface active agent. On addition of hydrogen peroxide, titanium ions and zirconium ions become complex ions and approach to each other in terms of pH at which they precipitate. As a result, mixing of titania and zirconia in the co-precipitate tends to proceed on an atomic level. With a surface active agent present in the system, if a non-uniform portion happens to be formed during co-precipitation, grains mainly comprising zirconia and grains mainly comprising titania grow in the micelles of the surface active agent in such directions as to make the composition uniform. As a result, solid solution particles having a uniform composition can easily be formed.

The surface active agent which can be used in the process of the present invention includes anionic, cationic or nonionic surface active agents. In particular, surface active agents which form micelles having a small space inside, such as spherical micelles, are desirable. Those having a critical micelle concentration of. 0.1 mol/l or less, particularly 0.01 mol/l or less, are desirable. The terminology "critical micelle concentration" is the minimal concentration of a surface active agent solution necessary for forming micelles.

The processes according to the present invention also include the step of drying and calcining a precipitate obtained by adding a pH adjusting agent to the raw material aqueous solution while powerfully stirring. In order to produce the powder in a stable manner, the drying and calcining step is preferably carried out at a rate of temperature rise of 100° C./hr or lower for the following reason. Heating of the mixed powder is conducted in the presence of considerable amounts of by-produced salts, such as ammonium nitrate. The by-produced salts in the precipitate often incur self-heating or self-ignition by the catalytic action of titanium ions while the temperature is being elevated. As a result, the temperature of the powder tends to rise higher than necessary, which can result in a reduced specific surface area. Such abrupt self-heating is effectively suppressed at a rate of temperature rise of 100° C./hr or less, particularly 50° C./hr or less.

The process for producing the titania-zirconia-alumina powder comprises the steps of;

(a) preparing a raw material aqueous solution comprising a titanium salt, a zirconium salt, and an aluminum salt, the concentration of the titanium salt and the zirconium salt being adjusted so as to give a final titania/zirconia weight ratio of 97/3 to 70/30 or 40/60 to 15/85, (b) adding a pH adjusting agent to the raw material aqueous solution while powerfully stirring to form a precipitate, and (c) drying and calcining the precipitate.

The process for producing the titania-zirconia-alumina powder alternatively comprises the steps of;

(a) preparing a raw material aqueous solution comprising a titanium salt and a zirconium salt, the concentration of the titanium salt and the zirconium salt being adjusted so as to give a final titania/zirconia weight ratio of 97/3 to 70/30 or 40/60 to 15/85, (b) preparing a raw material aqueous solution containing an aluminum salt, (c) adding a pH adjusting agent to each of the raw material aqueous solutions prepared in steps (a) and (b) while powerfully stirring to form a precipitate, (d) uniformly mixing the precipitates obtained in step (c), and (e) drying and calcining the mixed precipitate.

During the preparation of the raw material aqueous solution containing the titanium salt, the zirconium salt and the aluminum salt, an element capable of increasing the heat resistance of the titania-zirconia powder or the alumina powder, such as a rare earth element (e.g., Y, La) and an alkaline earth metal element (e.g., Ba), may be added in a concentration of 10 mol % or less in terms of cation. Further, when preparing the raw material aqueous solution containing the titanium salt and the zirconium salt, a rare earth element such as Y may be added to the solution in a concentration of 10 mol % or less in terms of cation contained in the finally obtained powder, and also when preparing the raw material aqueous solution containing the aluminum salt, a rare earth element such as La or an alkaline earth metal element such as Ba may be added to the solution in a concentration of 10 mol % or less in terms of cation contained in the finally obtained powder.

The meaning and the preference of "powerful stirring" as referred to herein are the same as described with reference to the process for producing the titania-zirconia powder. Addition of aqueous hydrogen peroxide and a surface active agent to the raw material aqueous solution and control of the rate of temperature rise in the drying and calcination step are also preferred in this process for the same reasons as described above. The details and preferred means for these manipulations as described above also apply here.

If desired, the step of drying and calcination can be preceded by the step of concentrating the precipitate by filtration or decantation and/or the step of removing by-products by washing and the like. These additional steps raise the limit of the rate of temperature rise but increases the processing cost.

The present invention will now be illustrated in greater detail with reference to Examples, but it should be understood that the invention is not deemed to be limited thereto. Unless otherwise noted, all the percents are by weight.

EXAMPLE 1 TO 9 AND COMPARATIVE, EXAMPLES 1 TO 5

Preparation of $TiO_2$—$xZrO_2$ Powder (x=0 to 100%):

A titanium tetrachloride aqueous solution having a concentration of 27.5% in terms of $Ti_2$ and a zirconium oxynitrate aqueous solution having a concentration of 18% in terms or $ZrO_2$ were weighed according to Table 1 and dissolved in 1000 g of water. To the solution were added 160 g of 30% aqueous hydrogen peroxide and 24 g of a nonionic surface active agent (Reokon 1020H, produced by Lion Corp.) to prepare a raw material aqueous solution.

The raw material aqueous solution was uniformly stirred in a homogenizer (shear rate: 13,000 $sec^{-1}$) equipped with a propeller, and diluted aqueous ammonia (456 g of 25% aqueous ammonia diluted with 1000 g of water) was added to the solution while being stirred to form a precipitate.

The precipitate was dried at 150° C. and then heated up to 500° C. at a rate of 50° C./hr, at which the precipitate was calcined for 5 hours to obtain a titania-zirconia powder. The specific surface area of the resulting powder was measured. The powder was further calcined at 800° C. for 5 hours, and the specific surface area was again measured. The results obtained are shown in Table 1 and graphically represented in FIGS. 1A and 1B.

It is seen from Table 1 and FIGS. 1A and 1B that the powders prepared in Examples 1 to 5 which have a zirconia content of 3 to 30% all have a specific surface area of 45 $m^2/g$ or more even after heated at 800° C. for 5 hours, whereas the specific surface area of the powder of Comparative Example 1 ($ZrO_2$: 0%) is extremely small, and that of the powders of Comparative Example 2 ($ZrO_2$: 40%) and Comparative Example 3 ($ZrO_2$: 50%) are also small (see FIG. 1B)

On the other hand, the powders of Examples 5 to 9 having a zirconia content of 60 to 85% have a specific surface area as high as 140 $m^2/g$ or more after heated at 500° C. for 5 hours, whereas the specific surface area of the powders of Comparative Example 4 ($ZrO_2$: 90%) and Comparative Example 5 ($ZrO_2$: 100%) is less than 140 $m^2/g$ (see FIG. 1A). Further, the powders of Examples 5 to 9 maintain a specific surface area of 35 $m^2/g$ or more after heated at 800° C. for 5 hours, while the specific surface area of the powders of Comparative Examples 1 to 5 is less than 35 $m^2/g$ after the same heat treatment (see FIG. 1B).

Among the 800° C. calcined powders, the powder of Example 2 ($ZrO_2$: 10%) has the largest specific surface area. Among the 500° C. calcined powders, the powder of Example 7 ($ZrO_2$: 70%) has the largest specific surface area, which exceeds 200 $m^2/g$, reaching 201.3 $m^2/g$ (see FIGS. 1A and 1B).

TABLE 1

| | $TiCl_4$ Aq. Soln. | | $ZrO(NO_3)_2$ Aq. Saln. | | Specific Surface Area ($m^2/g$) | |
|---|---|---|---|---|---|---|
| | Weight (g) | Ti Content as $TiO_2$ (wt %*) | Weight (g) | Zr Content as $ZrO_2$ (wt %*) | 500° C. | 800° C. |
| Comp. Ex. 1 | 436.0 | 100 | 0.0 | 0 | 49.6 | 4.7 |
| Ex. 1 | 414.2 | 95 | 33.3 | 5 | 97.2 | 49.8 |
| Ex. 2 | 392.4 | 90 | 66.7 | 10 | 86.4 | 63.5 |
| Ex. 3 | 348.8 | 80 | 133.3 | 20 | 82.3 | 48.5 |
| Ex. 4 | 305.2 | 70 | 200.0 | 30 | 117.1 | 46.7 |
| Comp. Ex. 2 | 261.6 | 60 | 266.7 | 40 | 126.0 | 32.5 |
| Comp. Ex. 3 | 218.0 | 50 | 333.3 | 50 | 133.0 | 24.6 |
| Ex. 5 | 174.4 | 40 | 400.0 | 60 | 167.5 | 35.8 |
| Ex. 6 | 152.6 | 35 | 433.3 | 65 | 188.4 | 37.4 |
| Ex. 7 | 130.8 | 30 | 466.7 | 70 | 201.3 | 41.5 |
| Ex. 8 | 87.2 | 20 | 533.3 | 80 | 172.9 | 36.7 |
| Ex. 9 | 65.4 | 15 | 567.0 | 85 | 150.0 | 35.1 |
| Comp. Ex. 4 | 43.6 | 10 | 600.0 | 90 | 98.6 | 31.5 |
| Comp. Ex. 5 | 0.0 | 0 | 666.7 | 100 | 39.8 | 23.4 |

*Based on the total amount of $TiO_2$ and $ZrO_2$.

Figure 2:
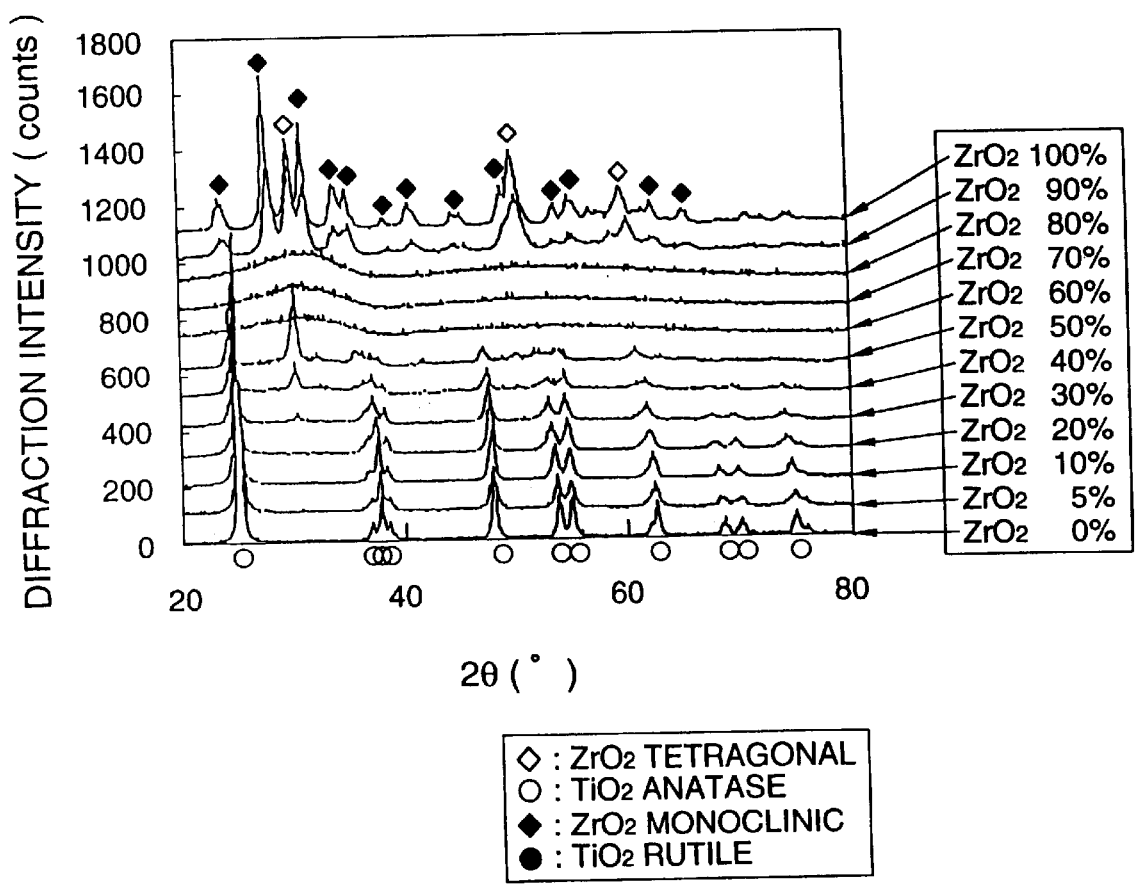
FIG. 2 shows X-ray diffraction patterns of the titania-zirconia powders ($TiO_2$: 0 to 100 wt %) calcined at 500° C. for 5 hours.
Figure 3:
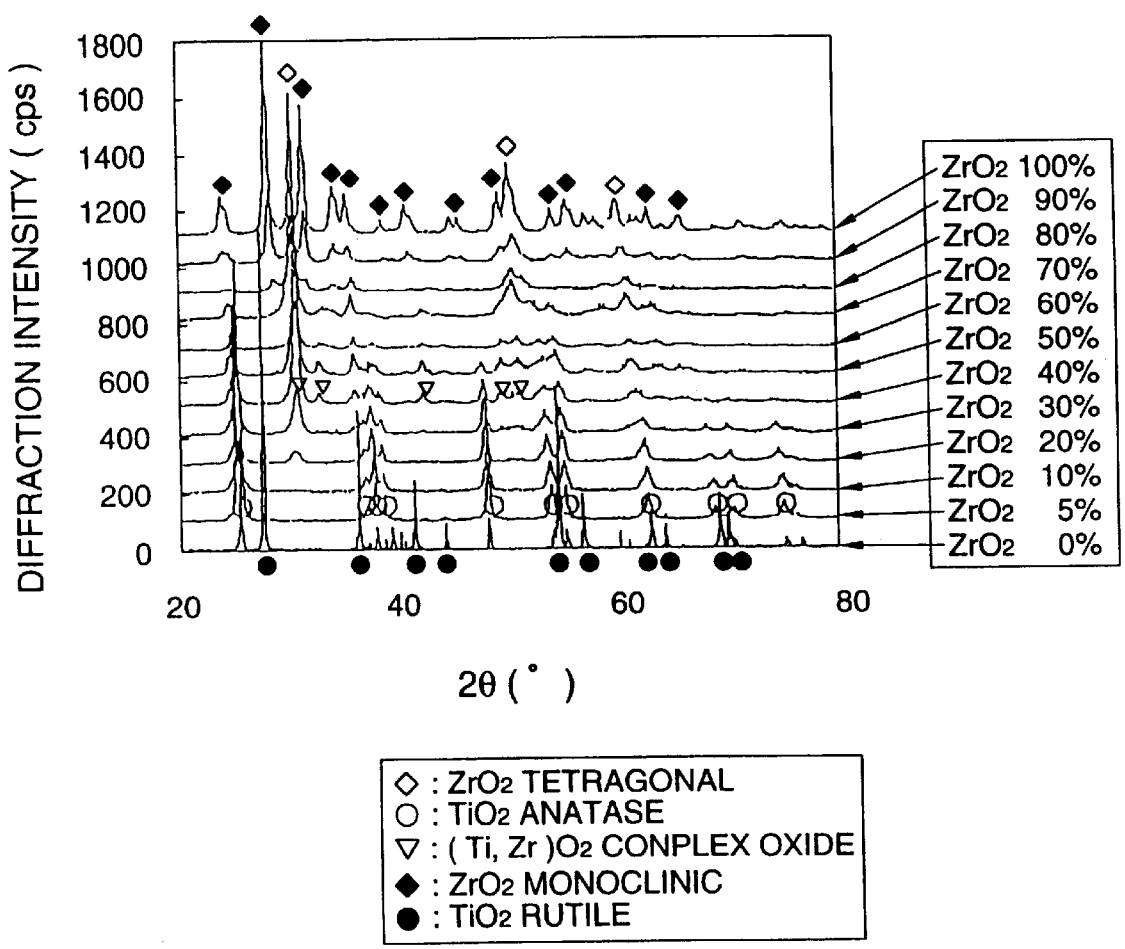
FIG. 3 shows X-ray diffraction patterns of the titania-zirconia powders ($TiO_2$: 0 to 100 wt %) calcined at 800° C. for 5 hours.
Figure 4A:
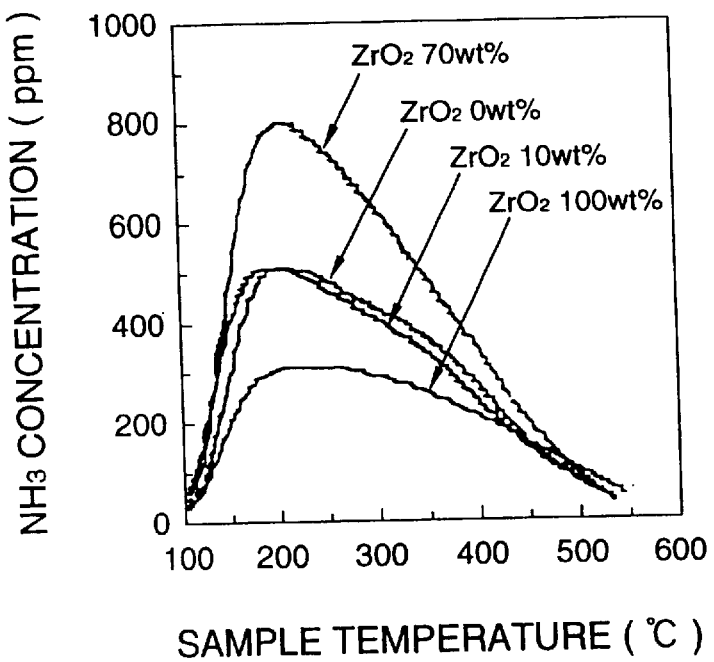
FIGS. 4A and 4B show the results of ammonia temperature-programmed desorption test.
Figure 4B:
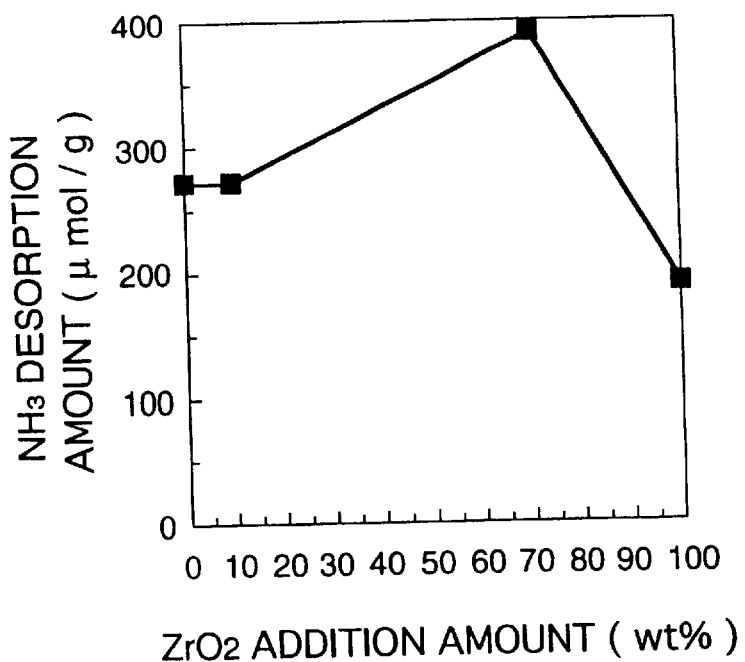
Figure 5A:
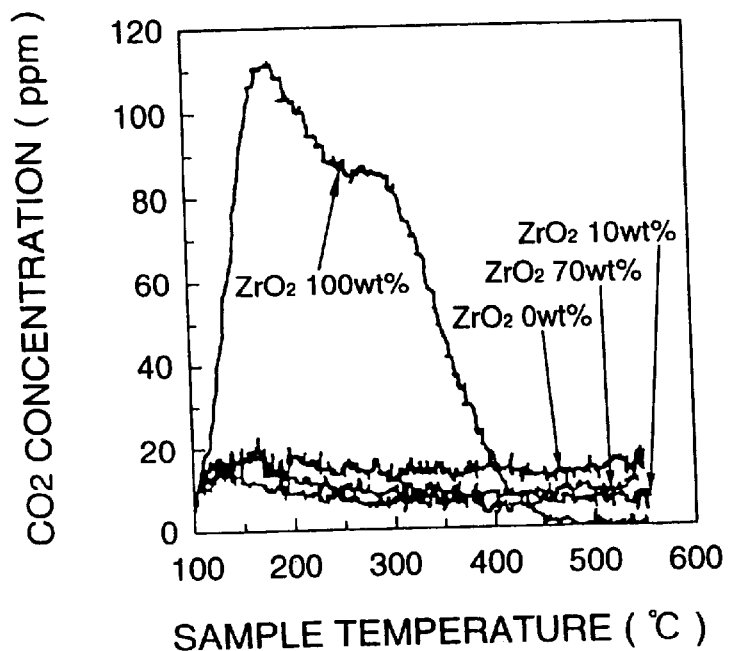
FIGS. 5A and 5B show the results of carbon dioxide temperature-programmed desorption test.
Figure 5B:
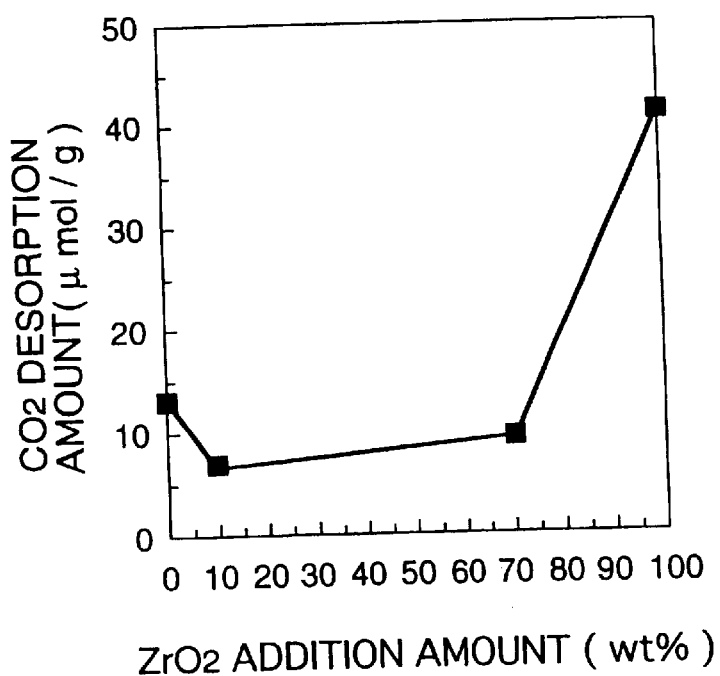

In FIGS. 2 and 3 are shown the X-ray diffraction patterns of the 500° C. calcined $TiO_2$—$ZrO_2$ powders and the 800° C. calcined $TiO_2$—$ZrO_2$ powders, respectively, of Examples 1 to 5, 7, and 8 and Comparative Examples 1 to 5.

The X-ray diffraction patterns shown in FIG. 2 reveal that the 500° C. calcined powders having a $ZrO_2$ content of 60% (Example 5), 70% (Example 7) and 80% (Example 8), which have a large specific surface area, are amorphous. It is seen from FIG. 2 that an anatase phase of $TiO_2$ appears with the $ZrO_2$ content of 50% or less and that a tetragonal phase or a monoclinic phase of $ZrO_2$ appears with the $ZrO_2$ content of 90% or more.

The X-ray diffraction patterns (FIG. 3) of the 800° C. calcined powders shows that a rutile phase of $TiO_2$ is produced with a zero $ZrO_2$ content (0% $ZrO_2$). With the $ZrO_2$ content being 5% or more, the $TiO_2$ crystalline phase consists of an anatase phase with no rutile phase, crystallographically indicating that the powders have acquired improved heat resistance.

The peaks attributed to the (200) plane of the anatase $TiO_2$ in the X-ray diffraction patterns shown in FIGS. 2 and 3 (measured with CuKα1) are tabulated in Table 2 below. While the peak of anatase phase (200) of 100% $Tie_2$ is 2θ=48.04° when the powder is calcined at 500° C., it is seen that the peak shifts to the smaller angle side with the $ZrO_2$ content, which proves that $ZrO_2$ is solid-dissolved in the anatase phase of $TiO_2$.

TABLE 2

| $ZrO_2$ Content | 2θ (°) of Peak Attributed to $TiO_2$ Anatase Phase (200) | |
|---|---|---|
| (wt %) | 500° C. | 800° C. |
| 0 | 48.04 | 48.12 |
| 5 | 48 | 48.01 |
| 10 | 47.88 | 47.99 |
| 20 | 47.8 | 47.87 |
| 30 | 47.72 | 47.78 |
| 40 | 47.72 | 47.73 |
| 50 | 47.64 | 47.56 |

Further, the peaks attributed to the (101) plane of the $ZrO_2$ tetragonal phase and those attributed to the (111) plane of the complex oxide $(Ti,Zr)O_2$ phase appearing in the X-ray diffraction patterns shown in FIGS. 2 and 3 (measured with CuKα1) are tabulated in Table 3 below.

TABLE 3

| $ZrO_2$ Content | 2θ (°) of Peak Attributed to Tetragonal $ZrO_2$ Phase (101) or $(Ti,Zr)O_2$ Phase (111) | | Crystalline phase |
|---|---|---|---|
| (wt %) | 500° C. | 800° C. | |
| 0 | | | |
| 5 | | | |
| 10 | | 30.36 | $(Ti,Zr)O_2$ |
| 20 | | 30.4 | $(Ti,Zr)O_2$ |
| 30 | 30.64 | 30.61 | $(Ti,Zr)O_2$ |
| 40 | 30.64 | 30.63 | $(Ti,Zr)O_2$ |
| 50 | 30.6 | 30.6 | $(Ti,Zr)O_2$ |
| 60 | | 30.64 | tetragonal |
| 70 | | 30.43 | tetragonal |
| 80 | | 30.4 | tetragonal |
| 90 | 30.28 | 30.26 | tetragonal |
| 100 | 30.24 | 30.24 | tetragonal |

When the powders having a $ZrO_2$ content of 60% or more are calcined at 800° C., the crystalline phase predominantly comprises a tetragonal phase of $ZrO_2$. While the peak of the tetragonal phase of 100% $ZiO_2$ is 2θ=30.24° when the powder is calcined at 800° C., it is seen that the peak shifts to the larger angle side with the $TiO_2$ content, which proves that $TiO_2$ is solid-dissolved in the tetragonal phase of $ZiO_2$.

With the $ZrO_2$ content ranging from 10 to 50%, a complex oxide phase $(Ti,Zr)O_2$ co-exists. The peak assigned to the (111) plane of the complex oxide phase also changes with the $ZrO_2$ content, indicating the change of the Ti/Zr ratio in this phase.

The crystalline phase constitution of the 800° C. calcined powders as analyzed from their X-ray diffraction patterns is summarized in Table 4 below, in which a circle (○) symbolizes a proportion exceeding 20%; a triangle (Δ) symbolizes a proportion smaller than 20%; and a letter X symbolizes a trace proportion or means that the crystalline phase was not detected.

From Table 4 the following observations can be drawn. The $TiO_2$—$ZrO_2$ powders of Examples 1 to 4, in which the titania crystal comprises an anatase phase and which has a zirconia content of 3 to 30%, contains less than 20% of the complex oxide $(Ti,Zr)O_2$. In the $TiO_2$—$ZrO_2$ powders of Examples 5 to 9, in which the crystalline phase comprises a tetragonal zirconia phase and which has a titania content of 15 to 40%, the total content of the complex oxide $(Ti,Zr)O_2$, monoclinic zirconia, and anatase titania is less than 20%.

TABLE 4

Crystalline phase Constitution after 800° C. Calcination

| | $ZrO_2$ Content | | Tetragonal Rutile | Tetragonal Anatase | Ortho-rhombic (Ti, Zr) $O_2$ | Tetragonal Zirconia | Monoclinic Zirconia |
|---|---|---|---|---|---|---|---|
| | (wt %) | (mol %) | | | | | |
| Comp. Ex. 1 | 0 | 0 | ○ | ○ | X | X | X |
| Ex. 1 | 5 | 3.3 | X | ○ | Δ | X | X |
| Ex. 2 | 10 | 6.7 | X | ○ | Δ | X | X |
| Ex. 3 | 20 | 14.0 | X | ○ | Δ | X | X |
| Ex. 4 | 30 | 21.8 | X | ○ | Δ | X | X |
| Comp. Ex. 2 | 40 | 30.2 | X | ○ | ○ | X | X |
| Comp. Ex. 3 | 50 | 39.4 | X | Δ | ○ | Δ | X |
| Ex. 5 | 60 | 49.4 | X | X | Δ | ○ | X |
| Ex. 6 | 65 | 54.7 | X | X | Δ | ○ | X |
| Ex. 7 | 70 | 60.3 | X | X | Δ | ○ | X |
| Ex. 8 | 80 | 72.2 | X | X | X | ○ | Δ |
| Ex. 9 | 85 | 78.7 | X | X | X | ○ | Δ |
| Comp. Ex. 4 | 90 | 85.4 | X | X | X | ○ | ○ |
| Comp. Ex. 5 | 100 | 100 | X | X | X | Δ | ○ |

The TiO$_2$—ZrO$_2$ powders of Example 2 (ZrO$_2$: 10%), Example 7 (ZrO$_2$: 70%), Comparative Example 1 (ZrO$_2$: 0%), and Comparative Example 5 (ZrO$_2$: 100%) were subjected to an ammonia (NH$_3$) and carbon dioxide (CO$_2$) temperature-programmed desorption (TPD) test, and the surface acidic sites and basic sites were measured. The results of the TPD test are shown in FIGS. 4A, 4B, 5A and 5B. It is recognized that the powders of Examples 2 and 7, while containing ZrO$_2$, have acidic sites only with few basic sites on their surface similarly to the powder of Comparative Example 1 (100% TiO$_2$). On the other hand, it is seen that there are both acidic sites and basic sites on the surface of the powder of Comparative Example 5 (100% ZrO$_2$)

TEST EXAMPLE

In order to examine influences of yttria on the specific surface area of a titania-zirconia powder, the TiO$_2$—ZrO$_2$ powders having the same weight ratio of TiO$_2$:ZrO$_2$ of Example 2 (TiO$_2$:ZrO$_2$=9:1) plus a varied amount of Y$_2$O$_3$ based on the total amount of the final oxide were prepared and calcined at 900° C. for 5 hours. The specific surface area of the calcined powder is shown in Table 5 and graphed in FIG. 6.

TABLE 5

| Y$_2$O$_3$ Content (wt %) | 0 | 0.5 | 1 | 1.5 | 2 | 3 | 4 | 5 | 10 |
|---|---|---|---|---|---|---|---|---|---|
| Specific Surface Area (m$^2$/g) | 30.3 | 36.7 | 38.9 | 39.3 | 39.8 | 37.6 | 37.2 | 36.3 | 34.6 |

Figure 6:
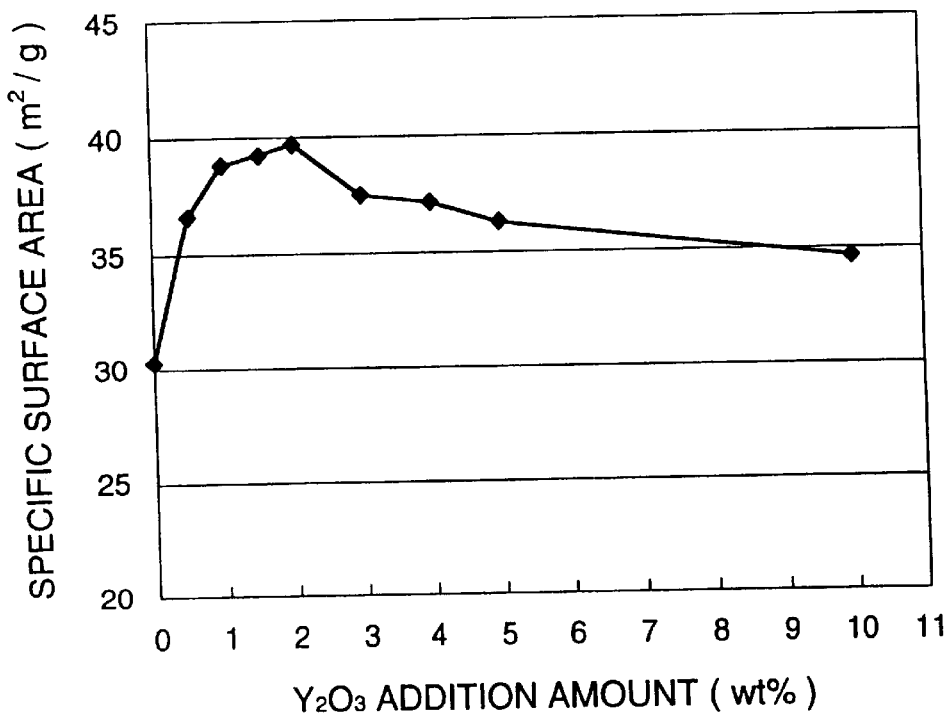
FIG. 6 is a graphical representation of Table 4, showing the influence of yttria ($Y_2O_2$) on the specific surface area of a titania-zirconia powder.

It is recognized from Table 5 and FIG. 6 that addition of Y$_2$O$_3$ results in an increase of specific surface area. Addition of 0.5% of Y$_2$O$_3$ produces a significant effect, and the effect reaches the maximum at 2% addition. Addition of more than 3% does not result in further improvement.

EXAMPLE 10

Preparation of TiO$_2$-10% ZrO$_2$-2% Y$_2$O$_3$ Powder:

In 1000 g of water were dissolved 383.7 g of a titanium tetrachloride aqueous solution having a concentration of 27.5% in terms of TiO$_2$, 66.7 g of a zirconium oxynitrate aqueous solution having a concentration of 18% in terms of ZrO$_2$, and 8.14 g of a yttrium nitrate aqueous solution having a concentration of 29.48% in terms of Y$_2$O$_3$, and 160 g of 30% aqueous hydrogen peroxide and 24 g of a nonionic surface active agent (Reokon 1020H, produced by Lion Corp.) to prepare a raw material aqueous solution.

The raw material aqueous solution was uniformly stirred in a homogenizer, and diluted aqueous ammonia (456 g of 25% aqueous ammonia diluted with 1000 g of water) was added to the solution while being stirred to form a precipitate. The precipitate was dried at 150° C. and then heated up to 500° C. at a rate of 50° C./hr, at which the precipitate was calcined for 5 hours to obtain a yttria-containing titania-zirconia powder. The resulting powder was further calcined at 600° C., 700° C., 800° C. or 900° C. for 5 hours, and the specific surface area was measured. The results obtained are shown in Table 6 and graphed in FIG. 7.

COMPARATIVE EXAMPLE 6 AND REFERENCE EXAMPLE

A precipitate was formed in the same manner as in Example 2, except that the stirring by means of a homogenizer was not conducted. The precipitate was dried at 150° C., followed by calcination at 600° C., 700° C., 800° C. or 900° C. for 5 hours in the same manner as in Example 2. The specific surface area of the resulting powders was measured. The results obtained are shown in Table 6 and FIG. 7.

For reference, the specific surface area of a commercially available anatase phase titania powder was measured in the same manner. The 500° C. calcined titania-zirconia powder obtained in Example 2 was similarly calcined at a varied temperature for 5 hours, and the specific surface area was measured.

Figure 7:
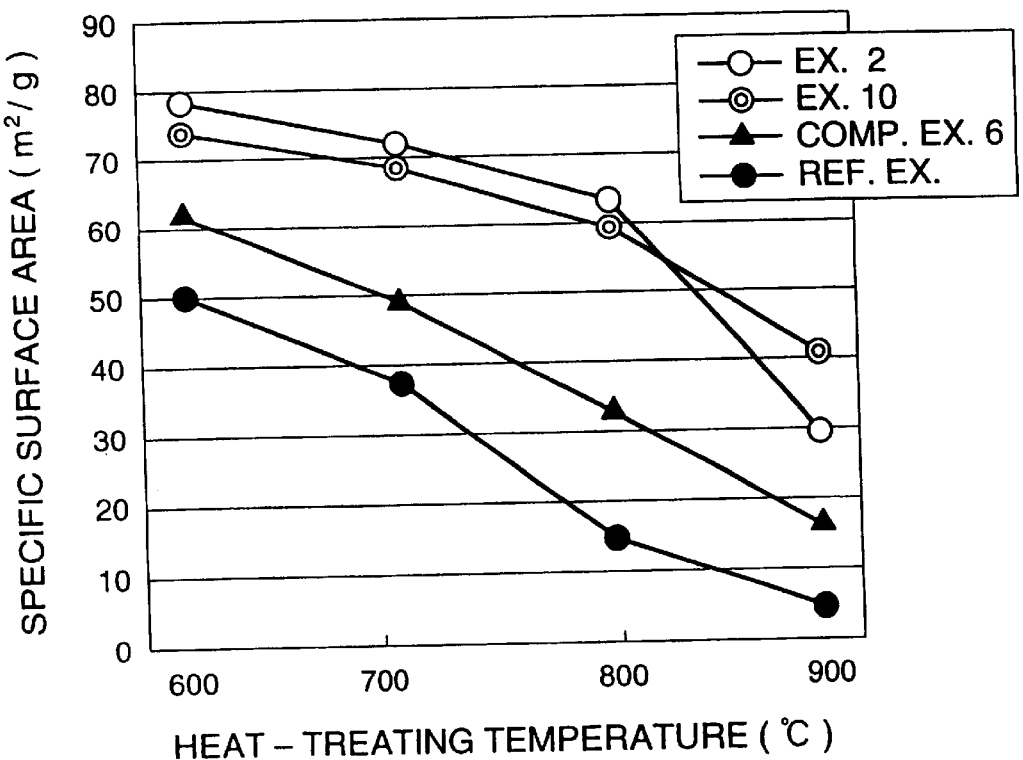
FIG. 7 is a graphical representation of Table 5, showing the relationship of specific surface area of the powders of Examples 2 and 8, Comparative Example 6, and Reference Example vs. heat-treating temperature.

The results obtained are shown in Table 6 and FIG. 7.

TABLE 6

| | Specific Surface Area (m$^2$/g) | | | |
|---|---|---|---|---|
| | 600° C. | 700° C. | 800° C. | 900° C. |
| Example 10 | 73.9 | 68.1 | 59.5 | 39.8 |
| Comparative Example 6 | 62.3 | 49.3 | 33.4 | 16.6 |
| Reference Example | 49.9 | 37.8 | 15.2 | 5.3 |
| Example 2 | 78.6 | 71.5 | 63.5 | 30.3 |

As is apparent from Table 6 and FIG. 7, the titania-zirconia powder of Example 2, which was obtained by the process including the step of stirring in a homogenizer has a large specific surface area after a heat treatment even at high temperatures of 800° C. or 900° C. Similarly to the powder of Example 2, the yttria-containing titania-zirconia powder of Example 10, which was also obtained by the process including the step of stirring in a homogenizer has a high specific surface area after a high-temperature treatment. To the contrary, the powder of Comparative Example 6 which was obtained by a process which does not include the step of stirring in a homogenizer underwent a considerable reduction in specific surface area in the high-temperature treatment. The same applies to the commercially available titania powder. It is also seen that the 900° C. calcined product of the yttria-containing titania-zirconia powder of Example 10 has a larger specific surface area than the 900° C. calcined product of the titania-zirconia powder of Example 2, while having the same crystalline phase constitution analyzed from the x-ray diffraction patterns as that of the titania-zirconia powder of Example 2.

EXAMPLE 11

Preparation of 50% Al$_2$O$_3$-35% ZrO$_2$-15% TiO$_2$ Powder:

In 1000 g of water were dissolved 441.2 g of an aluminum nitrate aqueous solution having a concentration of 13.6% in terms of Al$_2$O$_3$, 65.4 g of a titanium tetrachloride aqueous solution having a concentration of 27.5% in terms of TiO$_2$, and 233.3 g of a zirconium oxynitrate aqueous solution having a concentration of 18% in terms of ZrO$_2$, and 160 g of 30% aqueous hydrogen peroxide and 24 g of a nonionic surface active agent (Reokon 1020H, produced by Lion Corp.) were added to the solution to prepare a raw material aqueous solution.

Figure 8:
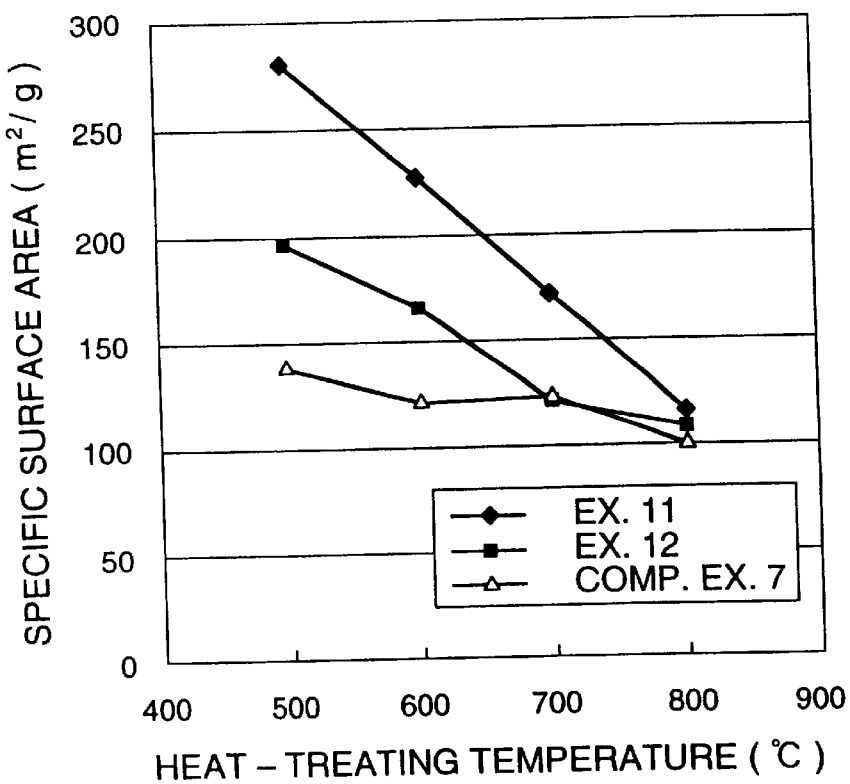
FIG. 8 is a graphical representation of Table 7, showing the relationship of specific surface area of the powders of Examples 11 and 12 and Comparative Example 7 vs. heat-treating temperature.

The raw material aqueous solution was uniformly stirred in a homogenizer, and diluted aqueous ammonia (456 g of 25% aqueous ammonia diluted with 1000 g of water) was added to the solution while being stirred to form a precipitate. The precipitate was dried at 150° C. and then heated up to 500° C. at a rate of 50° C./hr, at which the precipitate was calcined for 5 hours to obtain a titania-zirconia-alumina powder. The resulting powder was further calcined at 600° C., 700° C. or 800° C. for 5 hours, and the specific surface area was measured. The results obtained are shown in Table 7 and graphed in FIG. 8. The resulting powder was found to be a mixture of a $ZrO_2$—$TiO_2$ powder having an average particle size of 0.05 μm and an $Al_2O_3$ powder having an average particle size of 0.04 μm.

EXAMPLE 12

The titania-zirconia powder prepared in Example 7 which had an average particle size of 5 μm and an alumina powder having an average particle size of 2 μm were weighed to give the same $TiO_2$: $ZrO_2$:$Al_2O_3$ weight ratio as in Example 11 and dry mixed in a ball mill for 10 hours to obtain a mixed powder. In the mixed powder, the titania-zirconia powder had an average particle size of 0.7 μm and the alumina powder had an average particle size of 0.8 μm.

The resulting mixed powder was heat treated at 500° C., 600° C., 700° C. or 800° C. for 5 hours in the same manner as in Example 11, and the specific surface area of the calcined powders was measured. The results are shown in Table 7 and FIG. 8.

COMPARATIVE EXAMPLE 7

A commercially available titania powder having an average particle size of 0.5 μm, a commercially available zirconia powder having an average particle size of 1.1 μm, and an alumina powder having an average particle size of 2 μm were compounded at the same $TiO_2$: $ZrO_2$:$Al_2O_3$ weight ratio as in Example 11 and dry mixed in a ball mill for 10 hours. The resulting mixed powder was heat treated at 500° C., 600° C., 700° C. or 800° C. for 5 hours in the same manner as in Example 11, and the specific surface area of the calcined powders was measured. The results are shown in Table 7 and FIG. 8.

TABLE 7

| | Specific Surface Area (m²/g) | | | |
|---|---|---|---|---|
| | 500° C. | 600° C. | 700° C. | 800° C. |
| Example 11 | 280 | 227 | 171 | 115 |
| Example 12 | 196 | 165 | 120 | 107 |
| Comp. Example 7 | 139 | 122 | 125 | 100 |

The titania-zirconia-alumina powder of Example 11, which is a mixture of a $ZrO_2$—$TiO_2$ powder having an average particle size of 0.05 μm and an $Al_2O_3$ powder having an average particle size of 0.04 μm, retains a large specific surface area even after a high-temperature treatment. The powder of Example 12, a mixture of a $ZrO_2$—$TiO_2$ powder having an average particle size of 5 μm and an $Al_2O_3$ powder having an average particle size of 2 μm, also retains a large specific surface area after the high-temperature treatment, while somewhat inferior to the powder of Example 12.

To the contrary, the titania-zirconia-alumina powder of Comparative Example 7, which was prepared from a commercially available titania powder and a commercially available zirconia powder, is inferior in specific surface area after the high-temperature treatment to the powders of Examples 11 and 12, although the titania powder has an average particle size of 0.5 μm and the zirconia powder has an average particle size of 1.1 μm.

A catalyst having the composition: [Ba (0.2 mol)+K (0.1 mol)]/[Pt (2 g)+Rh (0.1 g)]/carrier (120 g) was prepared by using each of the 500° C. calcined powders of Examples 11 and 12 and Comparative Example 7 as a carrier. That is, 2 g of Pt and 0.1 g of Rh were adsorbed onto 120 g of the carrier, and 0.2 mol of barium acetate and 0.1 mol of potassium acetate were further supported thereon.

Each catalyst thus prepared was subjected to a 800° C. heat resistance test (high temperature durability test) and subsequently to a 600° C. sulfur poisoning durability test in accordance with the following test methods. After the testing, the $NO_x$ storing ability of the catalyst was evaluated according to the following method. The results obtained are shown in Table 11 and graphically represented in FIG. 9.

1) 800° C. Heat Resistance Test (High Temperature Durability Test) Method:

One gram of the catalyst was exposed to 800° C. for 5 hours in an atmosphere alternating from a rich model gas (2 minutes) to a lean model gas (2 minute) each having the composition (% by volume) shown in Table 8 below. The gas was fed at a rate of 1 liter/min.

TABLE 8

| Model Gas | $O_2$ | NO | $C_3H_6$ (% C) | CO | $H_2$ | $CO_2$ | $H_2O$ | $N_2$ |
|---|---|---|---|---|---|---|---|---|
| Lean (A/F* = 22) | 4.5 | 0.05 | 0.3 | 0.75 | 0.25 | 10 | 3 | balance |
| Rich (A/F* = 14) | 0.5 | 0.05 | 0.3 | 2.25 | 0.75 | 10 | 3 | balance |

Note: *A/F: air/fuel ratio

2) Sulfur Poisoning Durability (600° C.) Test Method:

A quartz tube having an inner diameter of about 10 mm was plugged with 1 g of the catalyst having been subjected to the above high temperature durability test and set in a durability testing apparatus. A rich model gas and a lean model gas having the compositions (% by volume) shown in Table 9 were introduced alternately at a rate of 0.5 liter/min for 30 seconds each. Meanwhile the inlet gas temperature was elevated, over a 30 minute period, from room temperature up to 600° C., which temperature was maintained for 4 hours. The amount of sulfur fed to the catalyst was 1.5 mol per mole of the total amount of barium and potassium supported on 1 g of the catalyst.

TABLE 9

| Model Gas | $O_2$ | $SO_2$ | $C_3H_6$ (% C) | CO | $H_2$ | $CO_2$ | $H_2O$ | $N_2$ |
|---|---|---|---|---|---|---|---|---|
| Lean | 7.7 | 0.05 | 0.45 | 1.43 | 0.48 | 9.6 | 3 | balance |
| Rich | 0 | 0.05 | 0.48 | 4.5 | 1.5 | 10 | 3 | balance |

3) Evaluation of $NO_x$ Storing Ability:

A tubular fixed bed catalytic reactor was loaded with 0.5 g each of the catalyst having been subjected to the 800° C. heat resistance test (high temperature durability test) and the 600° C. sulfur poisoning durability test in this order. The catalyst was placed in a lean atmosphere by introducing a lean gas having the composition (% by volume) shown in Table 10 at a rate of 3 liter/min to store $NO_x$ in the form of nitrate and, in a rich atmosphere by introducing a rich gas having the composition (% by volume) shown in Table 10 for 3 seconds to reduce $NO_x$ into $N_2$, etc. The inlet gas temperature (reaction temperature) was varied from 200 to 600° C. as shown in Table 11. The amount of the reduced $NO_x$ (μmol/0.5 g-catalyst) was taken as the $NO_x$ storing ability of the catalyst.

TABLE 10

| Model Gas | O$_2$ | CO | H$_2$ | C$_3$H$_6$ (% C) | NO | H$_2$O | CO$_2$ | He |
|---|---|---|---|---|---|---|---|---|
| Lean | 6.63 | 0.02 | 0.01 | 0.07 | 0.08 | 3 | 11 | balance |
| Rich Pulse | 0 | 5.60 | 1.87 | 0.34 | 0.005 | 3 | 11 | balance |

TABLE 11

| | NO$_2$ Storing Ability ($\mu$mol/0.5 g-cat.) | | | | |
|---|---|---|---|---|---|
| | 200° C. | 300° C. | 400° C. | 500° C. | 600° C. |
| Example 11 | 3.88 | 5.66 | 11.26 | 10.42 | 9.99 |
| Example 12 | 3.44 | 5.45 | 5.56 | 8.64 | 7.85 |
| Comparative Example 7 | 3.74 | 3.74 | 3.95 | 3.44 | 3.72 |

Figure 9:
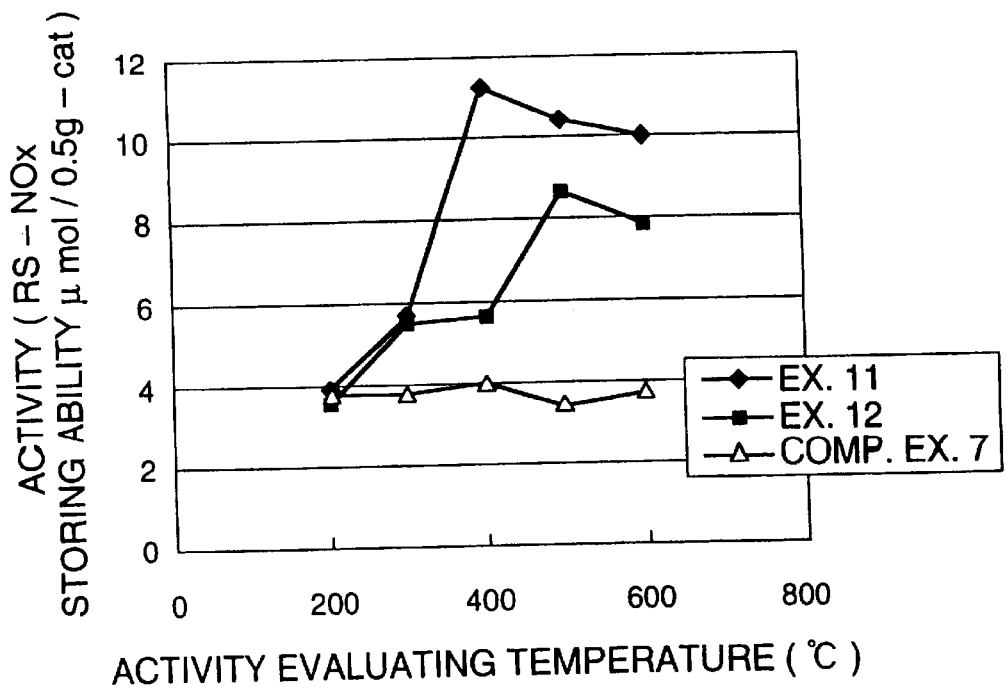
FIG. 9 is a graphical representation of Table 8, showing the $NO_x$ storing ability vs. temperature of the catalysts prepared by using the powders of Examples 11 and 12 and Comparative Example 7 as a carrier.

The results of Table 11 and FIG. 9 testify that the catalysts comprising the powders of Examples 11 and 12 as a carrier exhibit much higher NO$_x$ storing ability than the catalyst comprising the powder of Comparative Example 7 as a carrier at every reaction temperature except 200° C.

While the invention has been described in detail and with reference to specific examples thereof, it will be apparent to one skilled in the art that various changes and modifications can be made therein without departing from the spirit and scope thereof.

What is claimed is:

1. A titania-zirconia powder, wherein at least a part of the zirconia is dissolved in the crystalline phase of titania to form a solid solution, or at least a part of titania is dissolved in the crystalline phase of zirconia to form a solid solution.

2. The titania-zirconia powder as claimed in claim 1, comprising a zirconia in an amount of 3 to 30% by weight, and having a specific surface area of 45 m$^2$/g or more after being heat-treated at 800° C. for 5 hours in the air, wherein the titania-zirconia powder comprises an anatase phase titania, wherein the powder contains less than 20% by weight in total of a complex oxide having a composition of ZrTiO$_4$ or (Ti,Zr)O$_2$, monoclinic phase zirconia, and tetragonal phase zirconia.

3. The titania-zirconia powder as claimed in claim 2, further comprising an yttria in an amount of 0.5 to 10% by weight, and having a specific surface area of 34 m$^2$/g or more after being heat-treated at 900° C. for 5 hours in the air.

4. The titania-zirconia powder as claimed in claim 3, wherein at least a part of the zirconia is dissolved in the anatase phase to form a solid solution, and wherein at least one of the complex oxide and the tetragonal phase zirconia is dispersed in the anatase phase.

5. The titania-zirconia powder as claimed in claim 2, wherein at least a part of the zirconia is dissolved in the anatase phase to form a solid solution, and the at least one of the complex oxide, monoclinic phase zirconia, and tetragonal phase zirconia is dispersed in the anatase phase.

6. The titania-zirconia powder as claimed in claim 2, having an average particle size of 1 $\mu$m or smaller, and dispersed in an alumina powder.

7. The a titania-zirconia powder as claimed in claim 6, wherein the alumina powder has an average particle size of 1 $\mu$m or smaller.

8. The titania-zirconia powder as claimed in claim 2, wherein the complex oxide is contained in an amount of less than 10% by weight.

9. The titania-zirconia powder as claimed in claim 1, comprising a titania in an amount of 15 to 40% by weight, and having a specific surface area of 35 m$^2$/g or more after being heat-treated at 800° C. for 5 hours in the air, wherein the titania-zirconia powder comprises a tetragonal crystalline phase, at least a part of the titania is dissolved in said tetragonal phase to form a solid solution, wherein the powdered contains less than 20% by weight in total of a complex oxide having a composition of ZrTiO$_4$ or (Ti,Zr)O$_2$, monoclinic phase zirconia, and anatase phase titania.

10. The titania-zirconia powder as claimed in claim 9, having an average particle size of 1 $\mu$m or smaller, and dispersed in an alumina powder.

11. The titania-zirconia powder as claimed in claim 10, wherein the alumina powder has an average particle size of 1 $\mu$m or smaller.

12. The titania-zirconia powder as claimed in claim 9, having an average particle size of 0.1 $\mu$m or smaller and uniformly dispersed in an alumina powder having an average particle size of 0.1 $\mu$m or smaller.

13. The titania-zirconia powder as claimed in claim 9, wherein the complex oxide is contained in an amount of less than 10% by weight.

14. The titania-zirconia powder as claimed in claim 2, having an average particle size of 0.1 $\mu$m or smaller and uniformly dispersed in an alumina powder having an average particle size of 0.1 $\mu$m or smaller.

15. A catalyst carrier or a co-catalyst for purifying automotive exhaust gases which comprises the titania-zirconia powder of claim 1.

16. A process for producing the titania-zirconia powder of claim 1 comprising the steps of:
    (a) preparing a raw material aqueous solution comprising a titanium salt and a zirconium salt,
    (b) adding a pH adjusting agent to the raw material aqueous solution while powerfully stirring to form a precipitate, and
    (c) drying and calcining the precipitate.

17. An amorphous titania-zirconia powder, being a titania-zirconia powder wherein at least a part of the zirconia is dissolved in the crystalline phase of titania to form a solid solution, or at least a part of titania is dissolved in the crystalline phase of zirconia to form a solid solution after heat treatment.

18. The amorphous titania-zirconia powder as claimed in claim 17, being amorphous in the proportion of 90% by volume or more, comprising 60 to 85% by weight of zirconia, and having a specific surface area of 140 m$^2$/g or more after being heat-treated at 500° C. for 5 hours in the air.

19. The amorphous titania-zirconia powder as claimed in claim 18, being a titania-zirconia powder having a specific surface area of 35 m$^2$/g or more after being heat-treated at 800° C. for 5 hours in the air, wherein the titania-zirconia powder comprises a tetragonal crystalline phase, at least a part of the titania is dissolved in the tetragonal phase to form a solid solution, wherein the powder contains less than 20% by volume in total of a complex oxide having a composition of ZrTiO$_2$ or (Ti,Zr)O$_2$, monoclinic phase zirconia, and anatase phase titania.

20. The amorphous titania-zirconia powder as claimed in claim 19, wherein the complex oxide is contained in an amount of less than 10% by weight.

21. The amorphous titania-zirconia powder as claimed in claim 18, having an average particle size of 1 µm or smaller, and dispersed in an alumina powder.

22. The amorphous titania-zirconia powder as claimed in claim 21, wherein the alumina powder has an average particle size of 1 µm or smaller.

23. The amorphous titania-zirconia powder as claimed in claim 18, having an average particle size of 0.1 µm or smaller and uniformly dispersed in an alumina powder having an average particle size of 0.1 µm or smaller.

24. A catalyst carrier or a co-catalyst for purifying automotive exhaust gases, comprising the amorphous titania-zirconia powder of claim 17.

* * * * *